United States Patent
von Nessen-Lapp et al.

(10) Patent No.: US 6,227,754 B1
(45) Date of Patent: May 8, 2001

(54) COMPOSITE BODY

(75) Inventors: Kerstin von Nessen-Lapp, Altheim/Alb; Bernhard Trier, Germering; Michael Trunz, Ellwangen, all of (DE)

(73) Assignee: Carl-Zeiss-Stiftung, Heidenheim-Brenz (DE)

( * ) Notice: Subject to any disclaimer, the term of this patent is extended or adjusted under 35 U.S.C. 154(b) by 0 days.

(21) Appl. No.: 09/209,833

(22) Filed: Dec. 11, 1998

(30) Foreign Application Priority Data

Dec. 13, 1997 (DE) ................................. 197 55 483

(51) Int. Cl.$^7$ ............................................ F16B 12/04
(52) U.S. Cl. ............... 403/268; 403/24; 403/292; 403/404
(58) Field of Search .................... 403/268, 267, 403/266, 265, 404, 292, 24; 248/223.41

(56) References Cited

U.S. PATENT DOCUMENTS

| | | | |
|---|---|---|---|
| 4,320,984 | * | 3/1982 | Mayer et al. ............ 403/266 X |
| 4,518,446 | * | 5/1985 | Drennan ................... 156/63 |
| 4,721,541 | * | 1/1988 | Hodges ..................... 156/89.14 |
| 4,752,151 | * | 6/1988 | Ashida et al. ............. 403/267 |
| 4,826,303 | | 5/1989 | Meier . |
| 5,033,904 | * | 7/1991 | Challis ..................... 403/265 X |
| 5,037,234 | * | 8/1991 | De Jong ................... 403/268 |
| 5,660,492 | * | 8/1997 | Bathon ..................... 403/267 |
| 5,669,997 | * | 9/1997 | Robbert et al. ............ 156/101 |

FOREIGN PATENT DOCUMENTS

| | | | |
|---|---|---|---|
| 2646351 | * | 12/1977 | (DE) ................... 403/267 |
| 3711466 | | 10/1988 | (DE) . |
| 274856 | * | 1/1990 | (DE) ................... 403/265 |
| 3934546 | | 4/1991 | (DE) . |
| 0119975 | | 9/1984 | (EP) . |
| 0651101 | | 5/1995 | (EP) . |
| 1534224 | * | 1/1990 | (SU) ................... 403/265 |

OTHER PUBLICATIONS

"Direct Bonding: From an Optical Technology to a Broad Research Topic", Philips Journal of Research, NL, Elsevier, Amsterdam, Vol. 49, No. 1/02, pp.1–10.

* cited by examiner

*Primary Examiner*—Harry C. Kim
(74) *Attorney, Agent, or Firm*—Walter Ottesen

(57) ABSTRACT

The invention relates to a composite body which is assembled from at least two bodies. The first body is made of a first material and the second body of a second material and each of the two bodies has at least one joining surface. The joining surfaces lie opposite each other and the bodies are joined to each other by at least one adhesive connection. At least one recess for a compensating body made of a third material is introduced into at least one of the two joining surfaces. This compensating body is connected with at least one adhesive location or gluing gap to both bodies. An adhesive ensures an adhesive connection between the compensating body and the two bodies at the adhesive location.

32 Claims, 2 Drawing Sheets

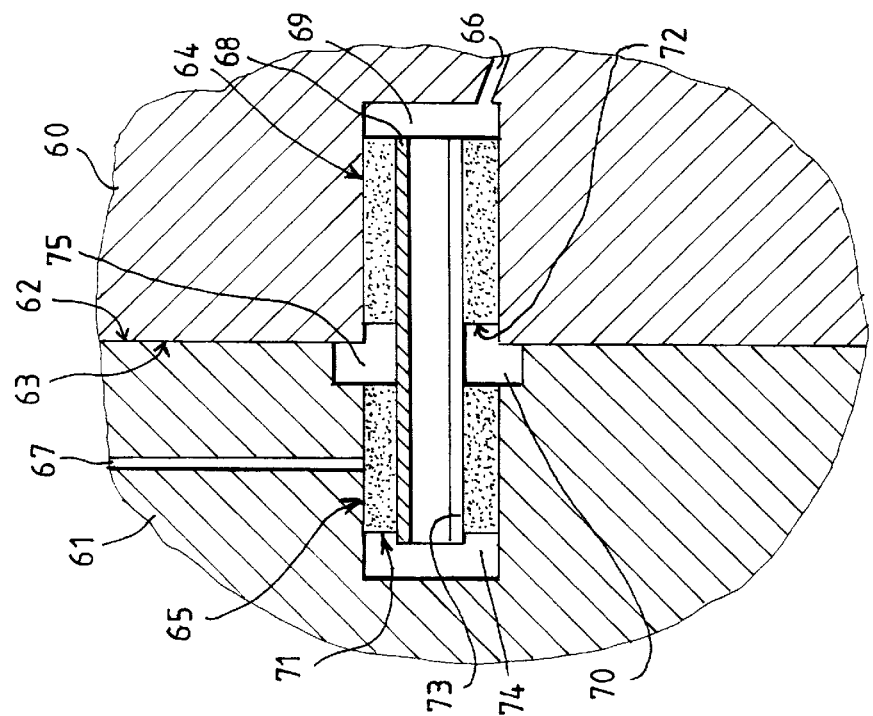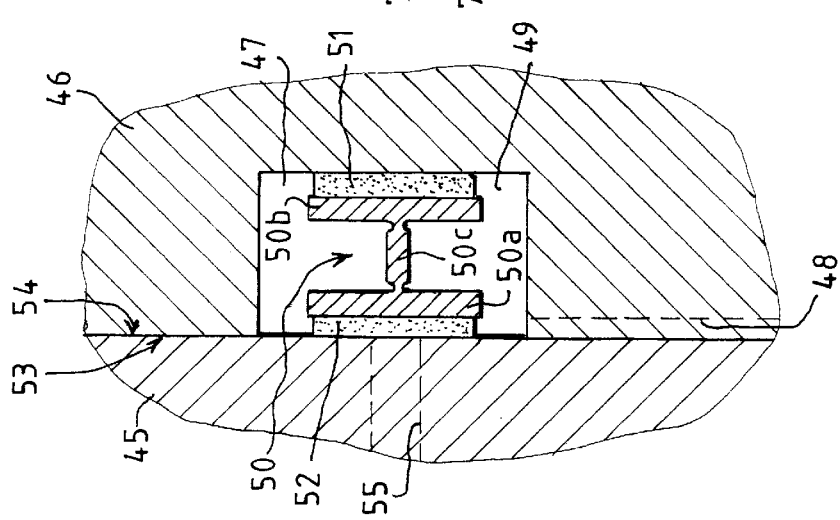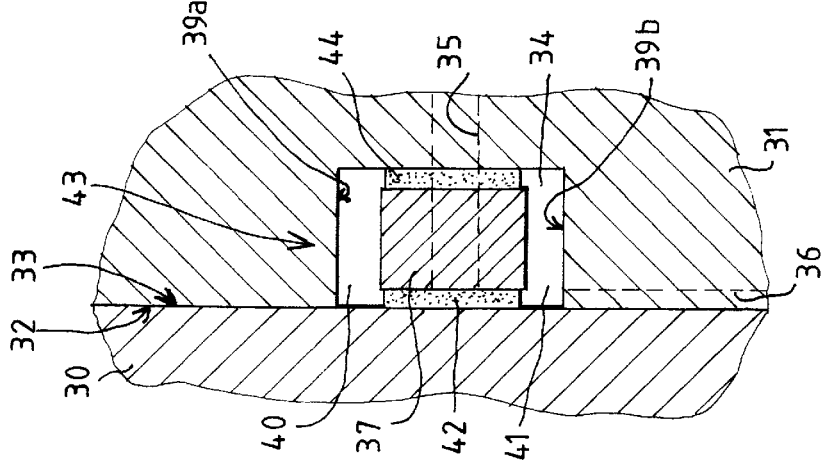

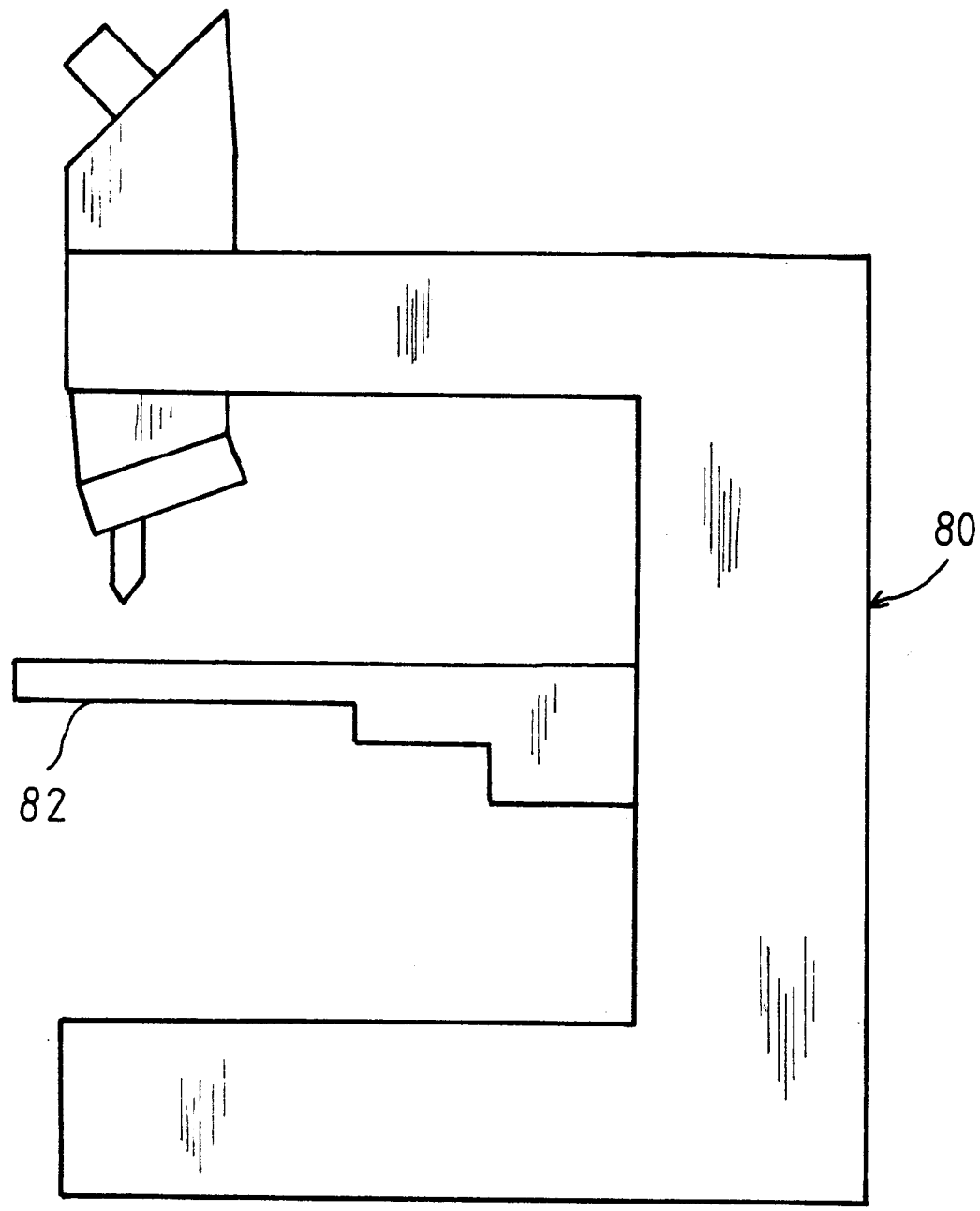

COMPOSITE BODY

FIELD OF THE INVENTION

The invention relates to a composite body which is made by joining at least two bodies together. The first body consists of a first material and the second body consists of a second material. Each of the two bodies has at least one connecting surface and the connecting surfaces lie opposite each other. Both connecting bodies are joined to each other by at least one adhesive connection.

BACKGROUND OF THE INVENTION

For certain applications, the body to be produced should have only minimal deformations after the assembly (the permissible range of deformation lies in the nanometer range). These applications include the production of larger bodies made of several individual bodies. The minimal deformations are preferably at the mirrored surfaces, measurement surfaces or support surfaces for other components. Not only is the size of the body to be produced relevant, but especially its form, such as inner edges. The application of these bodies is preferably in areas wherein nanometers are a relevant size such as in microscopy, astronomy, et cetera.

Essentially two methods are known in the state of the art of fine assembly technology for joining two bodies tightly to each other. These methods are presented as (a) and (b) below.

(a) When bodies are wrung to each other, optical surfaces are joined to each other via the van der Waal forces. Wringing is primarily used for force-tight temporary connections in manufacture. It is a disadvantage in this method that the two bodies joined by wringing easily separate because of liquids which wet the connecting edges. Wringing is also not necessarily resistant to vibration.

In production, wringing is used as a permanent connection for small optical elements having dimensions in the millimeter range. Large elements having dimensions in the centimeter range cannot be joined in this manner with the reliability required for a permanent connection.

Wringing can be improved and be made more reliable by means of a holding lacquer and/or an adhesive material outside of the wringing surfaces in order to increase the durability of the connection. However, the connection cannot be perfected.

(b) When applying adhesive in the absence of tension, the adhesive locations are usually optimized by a clever configuration of the adhesive locations (optimization of the adhesive gap and the adhesive pads). With this optimization, basic requirements (adhesive gap 1/10 mm, pads 6×6 mm) are considered in accordance with the state of the art.

Glued parts have the significant disadvantage that a force-tight and form-tight connection is not necessarily possible. The unavoidable creeping of the connection and the maladjustment of the parts to each other caused thereby likewise generates corresponding problems in some applications.

U.S. Pat. No. 4,826,303 discloses an arrangement for connecting at least two bodies with the bodies being connected to each other via a wedge-shaped connecting member without thermal constraining forces occurring. This arrangement has the disadvantage that both bodies have to be reworked after being joined because the wedge-shaped connecting member generates intense forces at the connecting surfaces. On the other hand, this connection is very stable.

German patent publication 3,934,546 shows an arrangement for adhesive-connecting two bodies by means of an intermediate piece. The intermediate piece is placed up to the surfaces of the two bodies and the surface cannot be used in those regions.

SUMMARY OF THE INVENTION

It is an object of the invention to provide a connection between larger bodies and especially bodies having low thermal coefficients of expansion (such as silicate, ceramic, Invar and the like). It is a further object of the invention to develop such a connection which is adequately satisfactory for processes and is force-tight as well as satisfies tolerance requirements in the nm range.

In the composite body of the invention, a compensating element is used and arranged in the two bodies to be attached, that is, this compensating element is enclosed in the interior of and surrounded by both bodies. The compensating element is a feature of the invention that makes possible a partial to total decoupling of the adhesive shrinkage without this adhesive shrinkage becoming manifest in a disturbing manner at the exterior.

With this compensating body, only very slight to no measurable deformations of the compensating composite body occur. A judicious form of the adhesive location as well as a judicious selection of the arrangement of the adhesive position within the connecting surfaces support the advantageous effects of the compensating body.

With the new connection, it is possible to form-tightly and force-tightly connect optical elements to each other, which have large dimensions, that is, dimensions greater than 10 cm. Experiments have been made wherein the surfaces to be joined had a longitudinal extent of more than 40 cm. The creeping of the adhesive is no longer a consideration. The necessary strength is ensured by the adhesive locations.

Utilization of the invention is suitable especially in optical apparatus operating with low wavelengths because of the slight deformations of the composite body caused by the adhesive connection. As an example, a positioning table is mentioned (with movements in the X, Y axes and sometimes also along the Z axis) as is needed especially in UV microscopy. In a preferred embodiment, such a device is part of a wafer chuck of a wafer stepper or a wafer scanner.

In this context, all bodies used including the compensating body should be made of one and the same material in order to avoid thermal stresses.

BRIEF DESCRIPTION OF THE DRAWINGS

The invention will now be described with reference to the drawings wherein:

FIG. 1 is a view of a first embodiment of the invention showing a detail of an adhesive location according to a feature of the invention;

FIG. 2 is a detail view showing a modification of the adhesive location presented in FIG. 1;

FIG. 3 shows another embodiment of the invention provided with an adhesive location according to another feature of the invention; and, FIG. 4 is a schematic outline of a microscope equipped with a positioning table made of a composite body as shown in FIGS. 1 and 2.

DESCRIPTION OF THE PREFERRED EMBODIMENTS OF THE INVENTION

FIGS. 1 and 2 each show composite bodies which can, for example, be portions of a positioning table. The positioning table can be, for example, of a UV microscope or part of a wafer chuck of a wafer stepper or wafer scanner. The optical apparatus can be, for example, a microscope 80 as shown in FIG. 4 having a positioning table 82.

With the adhesive locations shown in FIGS. 1 and 2, the influence of force can be reduced to approximately one tenth of that achieved with other joining techniques because of the adhesive connection and the deformations resulting therefrom.

The connection described below is between two bodies (30, 31) and uses a stress-reducing element 37 which can also be referred to as a compensating body. This compensating body is introduced between two adhesive locations and takes up the forces in the form of stresses caused by the shrinkage of the adhesive. The adhesive connection obtained in this manner causes considerably less deformations of the finely assembled bodies (30, 31) than joining techniques known as part of the state of the art.

The physical background for the deformation caused by an adhesive connection in the assembled bodies (30, 31) lies essentially in the shrinkage of the adhesive. The change of length in one of the two adhesive connections can be described essentially with the following equation:

$$\epsilon = \delta L / L_0$$

wherein $\epsilon$ represents the expansion and $\delta L$ represents the change of length and $L_0$ represents the length before the change.

The following equation should be noted:

$$F/A = E^* \epsilon$$

wherein F represents the force, A represents the adhesive surface and E represents the modulus of elasticity.

From the above, the following results:

$$F/A = E^* \delta L / L_0 \rightarrow F = E^* A^* \delta L / L_0 \rightarrow F \sim E^* A$$

If the force F and therefore the force on the adhesive location 43 is to be kept as low as possible, then the adhesive area A or the modulus of elasticity E must be reduced because $\delta L$ is pregiven by the shrinkage of the adhesive and $L_0$ is pregiven by the adhesive gaps (41, 42). The thickness of the adhesive gaps cannot be reduced down to any arbitrary amount because of the necessity of introducing the adhesive. The area A cannot be arbitrarily reduced and is fixed essentially by the required holding forces. The modulus of elasticity E is determined by the bodies (30, 31) to be adhesively joined.

In order to nonetheless reduce the force, an additional body 37 is used between the two bodies (30, 31) to be joined. The body 37 is introduced between the two adhesive locations in a hollow space 34 between the bodies (30, 31) to be joined. For this body 37, the cross-sectional area and/or the modulus of elasticity can be freely selected.

FIG. 1 shows a configuration of the invention utilizing the above considerations.

The bodies (30, 31) to be joined are preferably made of the same material because of the thermal coefficients of expansion. These materials can include, for example, silicate, ceramic or Invar. The bodies (30, 31) have respective connecting surfaces (32, 33) at which they are wrung to each other. Before wringing, a hollow space 34 in one body 31 is provided and this hollow space is open toward the connecting surface 33. The hollow space 34 can have the desired form such as that of a rectangle or cylinder. Two channels (35, 36) terminate in the hollow space 34.

The compensating element 37 is glued to the base of the hollow space 34 with a first adhesive gap 44 so that an annular air gap (40, 41) remains between the compensating element 37 and the side wall (39a, 39b) of the hollow space 34. After the compensating element 37 is glued into the hollow space 34, a first channel 35 is bored through the body 31 and through the compensating element 37. This first channel 35 later terminates in the center of the second adhesive gap 42 and the supply of adhesive for the second adhesive location on the compensating element 37 is introduced via this channel 35. A further recess is provided laterally of the air gap (40, 41) and defines a second channel 36 in the state wherein the two bodies (30, 31) are wrung together.

After the two bodies (30, 31) are wrung to each other, the necessary quantity of adhesive is introduced into the first channel 35 and a gas pressure is generated in the first channel 35 above the introduced adhesive. This gas pressure drives the adhesive into the second adhesive gap 42 between the compensating element 37 and the body 30. After making the second adhesive connection, no adhesive should be left in the first channel 35.

The compensating element 37 is intended to take up the tension forces. For this reason, the compensating element 37 should have a significantly lower modulus of elasticity than the bodies (30, 31) to be joined so that the reduction of forces actually takes place. The modulus of elasticity of the compensating element 37 should be less than 50% and preferably less than 10%.

The desired force reduction can be supported by an appropriate selection of the adhesive having a least possible shrinkage (in a range of less than 10% to 0.6%).

The adhesive feed channel 35 could also be introduced through the second body 30 of the bodies (30, 31) to be joined to the second adhesive gap 42 and the venting channel 36 could be arranged in the interior of the body 31, far away from the joining surfaces (32, 33).

In FIG. 2, a modification of the adhesive location 43 of FIG. 1 is shown. Here, the modifications essentially concern only the form of the compensating element 37 of FIG. 1 and the position of the adhesive feed channel 35 of FIG. 1.

As described with respect to FIG. 1, a hollow space 47 and a recess for an air outlet channel 48 are provided in one of the bodies 46 to be joined. The dimensioning of the hollow space 47 provides for a peripherally extending air gap 49 about the compensating element 50 between the latter and the side wall of the hollow space 47. The compensating element 50 is attached in the hollow space 47 by means of an adhesive. The adhesive fills out the entire first adhesive gap 51. Thereafter, the two bodies (45, 46) are so wrung at the two opposite-lying joining surfaces (53, 54) that the adhesive feed channel 55 which is introduced into the second body 45 ends as precisely as possible in the center of the adhesive surface above the compensating element 50. The adhesive feed takes place as already described with respect to FIG. 1. The adhesive should here too fill out the adhesive gap 52 as completely as possible.

In this embodiment, the compensating element (50) serves to take up the tension and bending forces. The compensating element 50 has a peripherally extending cross-sectional reduction below the gluing plates (50a, 50b), which are used for the gluing, at the ends of the connecting struts 50c. More specifically, the strut 50c has a reduced cross section at both ends thereof as shown in FIG. 2. This reduction in cross section generates the effect, which is described with respect to FIG. 1, even when the modulus of elasticity of the material of the compensating element (50)

is the same or even greater than the modulus of elasticity of the bodies (45, 46) to be joined.

However, even the forces, which occur in the connection of FIG. 1 or FIG. 2, can still be too great between the two bodies to be joined. If a force of close to zero on the bodies, which are to be joined at the adhesive location, is to be achieved, then the adhesive must be applied laterally between the two bodies and the compensating element. FIG. 3 shows how this can be realized.

A hollow space 64, which is open upwardly, is disposed in the connecting surface 62 of the first body 60 to be joined. The hollow space 64 has the desired cross section which is preferably circular and a venting channel 66 ends in the base of this hollow space 64.

In this hollow space 64, and before the two bodies (60, 61) are to be joined, a longitudinally slit connecting tube (compensating element) 68 is glued in an adhesive gap 72, which is almost completely annular, so that an air gap 69 toward the base of the hollow space 64 remains especially free of adhesive and the compensating element 68 ends above the base of the hollow space 64.

Likewise, a hollow space 65, which is open upwardly, is formed in the connecting surface 63 of the second body 61, which is to be joined. The hollow space 65 has the desired cross section which is preferably circular. An adhesive feed channel 67 ends laterally approximately in the center of the adhesive location to be generated later.

This hollow space 65 has a peripherally extending slot 70 at its end lying close to the connecting surface 63. The slot 70 has a larger diameter than the rest of the hollow space 65. This slot 70 is necessary in order to stop the flow of adhesive, which is caused by capillary forces, between the connecting tube 68 and the second body 61.

The diameter of the hollow space 65 is slightly greater than the hollow space 64 in the other body 60 to be joined in order to facilitate a subsequent adjustment of the two bodies (60, 61) to each other.

After the two bodies (60, 61) are wrung to each other at their connecting surfaces (62, 63), the previously determined quantity of adhesive is introduced into the adhesive channel 67 and is moved by gas pressure to the adhesive gap 71 between the connecting tube 68 and the second body 61. Here, it should be noted that the adhesive channel 67 terminates in the hollow space 65 on the side lying away from the slit 73 formed in the connecting tube 68. Here too, the connecting tube 68 ends above the base of the hollow space 65 in the second body 61 of the bodies (60, 61) to be joined so that here too an air gap 74 remains between the body 61 and the connecting tube 68. These two air gaps (69, 74) are important so that no forces can be transmitted from the connecting tube 68 to the bodies (60, 61). This objective is also achieved with the air gap 75 between the annular adhesive location 72 (between the first body 60 and the connecting tube 68) and the annular adhesive location 71 (between the second body 61 and the connecting tube 68).

Because of the slit 73 in the connecting tube 68, this tube can take up the deformations caused by the adhesive shrinkage acting laterally on the connecting tube (68) without forces being directed onto the connecting surfaces (62, 63) between the two bodies (60, 61).

In all of the drawings presented in FIGS. 1 to 3, it should be considered that the correct size relationships are not shown here. Especially, all adhesive gaps are much smaller than shown because the adhesive is intended to flow into these adhesive gaps via capillary force and an adhesive gap should therefore have a width that does not exceed a few tenths of a millimeter.

As an adhesive, all adhesives are suitable which exhibit a shrinkage as low as possible and which make possible a reliable adhesive connection with the material of the bodies to be joined. For the preferred materials of silicate and ceramic, epoxy adhesives having a shrinkage of less than 3% or less than 0.6% are especially suitable.

The adhesive feed channel should preferably be as free of adhesive as possible after carrying out the gluing.

The adhesive locations in the wringing surfaces between the two bodies to be joined serve to join the two bodies to each other especially for intense accelerations or changes thereof. The holding forces of these bodies must therefore especially then be fully effective when the bodies, which are to be joined, want to separate from each other at the joining surfaces. This can take place with different rapidity depending upon the geometry of the joined body and the position of the connecting surfaces relative to the direction or directions of acceleration. The connecting surfaces can additionally be joined to each other via wringing.

In FIGS. 1 and 2, the hollow space for accommodating the compensating element does not have to be configured in only one of the two bodies. It is equally effective to provide two hollow spaces lying opposite each other as precisely as possible. This modification however presents the disadvantage that a more precise adjustment of the two bodies, which are to be joined, to each other must take place when wringing. However, in special cases, this solution can be advantageous.

All components of the composite body should be made of the same material for reasons of thermal stability.

Parts of the surface of the composite body can be mirrored for positioning measurements thereof.

It is understood that the foregoing description is that of the preferred embodiments of the invention and that various changes and modifications may be made thereto without departing from the spirit and scope of the invention as defined in the appended claims.

What is claimed is:

1. A composite body comprising:
    a first body made of a first material and a second body made of a second material;
    said first and second bodies having first and second joining surfaces, respectively;
    said first and second joining surfaces being mutually adjacent;
    a compensating body made of a third material;
    at least one recess formed in one of said joining surfaces for accommodating said compensating body therein;
    first and second adhesive locations conjointly defined by said first and second bodies and said compensating body, respectively, at which said compensating body is joined to said first and second bodies;
    an adhesive at said adhesive locations for providing an adhesive connection between said first and second bodies and said compensating body; and,
    said first and second materials having first and second moduli of elasticity, respectively, and said third material having a modulus of elasticity at least 50% less than said first and second moduli of elasticity.

2. The composite body of claim 1, said first and second joining surfaces being in wringing contact engagement with each other; and, said at least one recess being formed in said one of said joining surfaces so as to lie essentially therein.

3. The composite body of claim 2, said recess being defined by a wall; and, said wall and said compensating body conjointly defining an air gap.

4. The composite body of claim 3, said compensating body including two adhesive plates and a strut interconnecting said adhesive plates; said strut having a cross section and each of said plates having a cross section greater than said cross section of said strut.

5. The composite body of claim 2, said composite body being a positioning table.

6. The composite body of claim 5, said positioning table being the positioning table of an optical apparatus which operates at a wavelength less than 400 nm.

7. The composite body of claim 6, said optical apparatus being a microscope.

8. The composite body of claim 1, said one recess being a first recess formed in said first joining surface and said composite body further comprising a second recess formed in said second joining surface so as to lie opposite said first recess; said compensating body being disposed in said first and second recesses; each of said recesses having a side wall adjacent said compensating body; and, the side walls and said compensating body conjointly defining said first and second adhesive locations, respectively.

9. The composite body of claim 8, said compensating body being a connecting tube and having respective ends; the walls of said first and second recesses and said ends of said compensating body defining first and second air spaces; said first adhesive location being between said first body and said connecting tube and said second adhesive location being between said second body and said connecting tube; and, said first and second adhesive locations conjointly defining a third air space.

10. The composite body of claim 9, said connecting tube being hollow.

11. The composite body of claim 10, said connecting tube defining a longitudinal axis and said connecting tube having a wall with a slot formed laterally therein and extending in the direction of said axis.

12. The composite body of claim 11, said slot extending completely through said wall of said connecting tube.

13. The composite body of claim 12, said second body having an adhesive feed channel formed therein so as to extend to said second adhesive location; and, said second body having a peripherally extending slot formed therein so as to extend around said second recess for preventing adhesive from running out and away from said second adhesive location.

14. The composite body of claim 13, said adhesive feed channel having an opening in said second recess at a location therein facing away from said slot formed in said connecting tube.

15. The composite body of claim 1, said composite body being a positioning table.

16. The composite body of claim 15, said positioning table being the positioning table of an optical apparatus which operates at a wavelength less than 400 nm.

17. The composite body of claim 16, said optical apparatus being a microscope.

18. A composite body comprising:
a first body made of a first material and a second body made of a second material;
said first and second bodies having first and second joining surfaces, respectively;
said first and second joining surfaces being mutually adjacent;
a compensating body made of a third material;
at least one recess formed in one of said joining surfaces for accommodating said compensating body therein;
first and second adhesive locations conjointly defined by said first and second bodies and said compensating body, respectively, at which said compensating body is joined to said first and second bodies;
an adhesive at said adhesive locations for providing an adhesive connection between said first and second bodies and said compensating body;
said first and second joining surfaces being in wringing contact engagement with each other; and,
said at least one recess being formed in said one of said joining surfaces so as to lie essentially therein.

19. The composite body of claim 18, said recess being defined by a wall; and, said wall and said compensating body conjointly defining an air gap.

20. The composite body of claim 19, said compensating body including two adhesive plates and a strut interconnecting said adhesive plates; said strut having a cross section and each of said plates having a cross section greater than said cross section of said strut.

21. The composite body of claim 18, said composite body being a positioning table.

22. The composite body of claim 21, said positioning table being the positioning table of an optical apparatus which operates at a wavelength less than 400 nm.

23. The composite body of claim 22, said optical apparatus being a microscope.

24. A composite body comprising:
a first body made of a first material and a second body made of a second material;
said first and second bodies having first and second joining surfaces, respectively;
said first and second joining surfaces being mutually adjacent;
a compensating body made of a third material;
at least one recess formed in one of said joining surfaces for accommodating said compensating body therein;
first and second adhesive locations conjointly defined by said first and second bodies and said compensating body, respectively, at which said compensating body is joined to said first and second bodies;
an adhesive at said adhesive locations for providing an adhesive connection between said first and second bodies and said compensating body;
said one recess being a first recess formed in said first joining surface and said composite body further including a second recess formed in said second joining surface so as to lie opposite said first recess;
said compensating body being disposed in said first and second recesses;
each of said recesses having a side wall adjacent said compensating body;
the side walls and said compensating body conjointly defining said first and second adhesive locations, respectively;
said compensating body being a connecting tube and having respective ends;
the walls of said first and second recesses and said ends of said compensating body defining first and second air spaces;
said first adhesive location being between said first body and said connecting tube and said second adhesive location being between said second body and said connecting tube; and,
said first and second adhesive locations conjointly defining a third air space.

25. The composite body of claim 24, said connecting tube being hollow.

26. The composite body of claim 25, said connecting tube defining a longitudinal axis and said connecting tube having a wall with a slot formed laterally therein and extending in the direction of said axis.

27. The composite body of claim 26, said slot extending completely through said wall of said connecting tube.

28. The composite body of claim 27, said second body having an adhesive feed channel formed therein so as to extend to said second adhesive location; and, said second body having a peripherally extending slot formed therein so as to extend around said second recess for preventing adhesive from running out and away from said second adhesive location.

29. The composite body of claim 28, said adhesive feed channel having an opening in said second recess at a location therein facing away from said slot formed in said connecting tube.

30. The composite body of claim 24, said composite body being a positioning table.

31. The composite body of claim 30, said positioning table being the positioning table of an optical apparatus which operates at a wavelength less than 400 nm.

32. The composite body of claim 31, said optical apparatus being a microscope.

* * * * *